M. H. KNAPP.

4443 COMBINED PLUTING & SAD IRON

REISSUED JUN 27 1871

ATTEST

Myron H. Church
H. F. Eberts

INVENTOR

Myron H. Knapp,
per attorney
Wm. E. Sprague

AM. PHOTO-LITHOGRAPHIC CO. N.Y. (OSBORNE'S PROCESS)

UNITED STATES PATENT OFFICE.

MYRON H. KNAPP, OF FULTON, NEW YORK, ASSIGNOR OF ONE-HALF INTEREST TO EDGAR F. YORK.

IMPROVEMENT IN FLUTING AND SAD IRONS.

Specification forming part of Letters Patent No. 105,953, dated August 2, 1870; reissue No. 4,443, dated June 27, 1871.

*To all whom it may concern:*

Be it known that I, MYRON H. KNAPP, of Fulton, in the county of Oswego and State of New York, have invented a new and useful Combined Fluting and Sad Iron; and I do declare that the following is a true and accurate description thereof, reference being had to the accompanying drawing and to the letters of reference marked thereon and being a part of this specification, in which—

Figure 1:
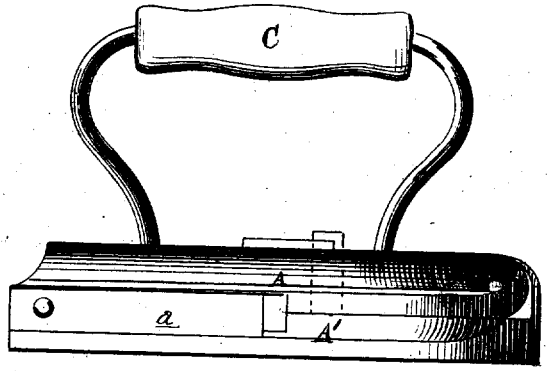
Figure 2:
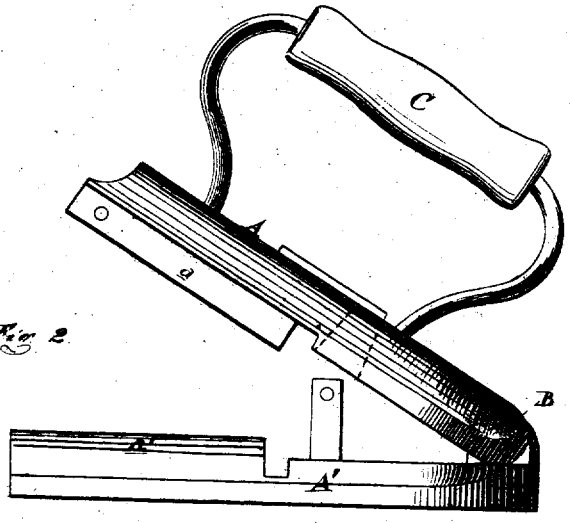
Figure 3:
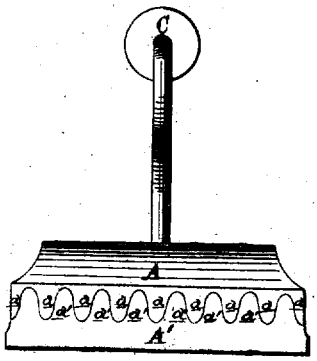

Figure 1 is a side elevation of my combined fluting and sad iron closed. Fig. 2 is a similar view, open to receive the fabric to be operated upon. Fig. 3 is a rear elevation of the device, and closed.

Like letters refer to like parts in each figure.

The nature of my invention relates to the construction of a sad or smoothing iron provided with a fluting device, arranged relatively to each other in such a manner that either may be used, as desired. The invention consists in constructing the iron in sections, one being the upper and the other being the lower, the upper face of the lower section and the bottom face of the upper section being corrugated and designed to match each other, while the lower face of the lower section is ground smooth to be used as a smoothing-iron; also, in the devices for securing the sections together when in use as a sad-iron, and in the general arrangement of the various parts, as more fully hereinafter shown and described.

In the accompanying drawing, A represents the upper, and A′ the lower section of a sad-iron, and these sections are pivoted together at B. A handle, C, of the ordinary type, is attached to the upper section. *a* are corrugations or flutes cut, milled, cast, or otherwise formed on and projecting downward from the lower face of the upper section, interlocking with similar corrugations or flutes *a′* projecting upward from the upper face of the lower section. When hinged together, and when in use as a sad or smoothing iron, the two sections are held together by any suitable device therefor.

The operation of the device, when used to flute any fabric capable of being so operated upon, will be readily understood, while its efficiency as a sad-iron is not impaired. By its use a fluting-iron is always heated for use at the time which it is most needed—*i. e.*, while the fabric is being ironed.

I do not intend to confine myself to the precise construction of the device as shown in the drawing and as above described, as many forms might be adapted for the construction of a combined sad and fluting iron, and it, or any part thereof, may be constructed of other material than iron, if desired.

What I claim as my invention, and desire to secure by Letters Patent, is—

1. A combined fluting and sad iron, constructed in sections, and so arranged that the same can be used for either fluting or smoothing, as may be desired.

2. The construction of a fluting and sad iron in two sections, A A′, provided with corrugations or flutes *a a′* in such a manner that the device may be used both as a fluter and sad-iron, substantially as described.

MYRON H. KNAPP.

Witnesses:
A. J. MILLER,
WM. MASSON.